United States Patent [19]

Hasegawa

[11] Patent Number: 4,998,014
[45] Date of Patent: Mar. 5, 1991

[54] OPTICAL COORDINATE-INPUT SYSTEM

[75] Inventor: Kazuo Hasegawa, Furukawa, Japan
[73] Assignee: Alps Electric Co., Ltd., Tokyo, Japan
[21] Appl. No.: 458,055
[22] Filed: Dec. 28, 1989

[30] Foreign Application Priority Data

Apr. 4, 1989 [JP] Japan .................................. 1-83944

[51] Int. Cl.⁵ .......................................... G01V 9/04
[52] U.S. Cl. ........................................ 250/221; 341/31
[58] Field of Search ........................... 250/221, 222.1; 340/555, 556, 557; 341/31

[56] References Cited

U.S. PATENT DOCUMENTS

| | | | |
|---|---|---|---|
| 4,645,920 | 2/1987 | Carroll et al. | 250/222.1 |
| 4,672,195 | 6/1987 | Golborne et al. | 250/221 |
| 4,812,642 | 3/1989 | Hasegawa et al. | 250/221 |

Primary Examiner—Davis L. Willis
Assistant Examiner—K. Shami
Attorney, Agent, or Firm—Guy W. Shoup

[57] ABSTRACT

An optical coordinate-input system. A plurality of pairs of light-emitting and light-receiving elements are mutually opposed on a two-dimensional input surface and arranged along the X and Y coordinate axes. A driver causes the light-emitting elements to sequentially emit light so as to scan the surface with light beams. A circuit sequentially binarizes signals from the light-receiving elements. When the interruption of the light beams occurs at a portion of the surface, signals from those light-receiving elements corresponding to this portion are also binarized by the circuit. A memory stores the binarized data in the form of units each consisting of a plurality of bits arranged in a sequence corresponding to the arrangement of the light-emitting and light-receiving elements along the X and Y coordinate axes. This writing is controlled so that that data is stored in different addresses. Whenever required, stored data is transmitted, while it is in the same form. Therefore, it is possible to read the necessary data alone at any desired time through simple procedures, thereby increasing the processing speed.

1 Claim, 3 Drawing Sheets

OPTICAL COORDINATE-INPUT SYSTEM

BACKGROUND OF THE INVENTION

1. Field of the Invention

The present invention relates to an optical coordinate-input system in which information on the position of a specific portion on a display surface that has been designated by a light-obstructing object such as a finger tip is inputted as coordinate data to an information processing apparatus such as a host computer.

2. Description of the Related Art

Optical coordinate-input apparatuses for obtaining coordinate data concerning a specific portion on a display surface of a display such as a CRT or an LCD, or on a surface of printing paper are known as touch panels or touch screens.

Such an optical coordinate-input apparatus includes an XY coordinate space which is formed on the front surface of a display and on which a two-dimensional scanning means is disposed. The two-dimensional scanning means comprises a plurality of pairs of light-emitting and light-receiving elements disposed on mutually opposing sides of the display surface forming an X and Y coordinate system. The light-emitting elements arranged along each of the X and Y axes are caused to sequentially emit light so as to perform two-dimensional scanning of the display surface with light beams. The coordinates of the position where light has been interrupted by a light-obstructing object, such as the tip of a finger or a pen that accessed to the display surface in order to designate the position of a specific portion of the display surface, are calculated to be used as input data.

FIG. 2 is a schematic illustration used to explain how such a known optical coordinate-input apparatus detects the coordinates at a specific position. The apparatus includes a display surface 1, a light-emitting element array (light emitting diode (LED) array) 2 extending along the X coordinate axis, a light-receiving element array (phototransistor (PTR) array) 3 extending along the X coordinate axis, a light-emitting element array (LED array) 4 extending along the Y coordinate axis, and a light-receiving element array (PTR array) 5 extending along the Y coordinate axis.

With this construction, the display surface is scanned in such a manner that light beams sequentially emitted by a plurality of light-emitting elements in the LED arrays 2 and 4 are sequentially received by a plurality of light-receiving elements in the PTR arrays 3 and 5 in accordance with the counts of a scan counter, not shown. The count values for particular PTRs to which the transmission of light beams from the mated LEDs has been interrupted are held. The count values or values calculated on the basis of the count values are sent to an external apparatus such as a host computer.

If the transmission of light beams has been interrupted at, for instance, a portion denoted by the symbol A in FIG. 2, data on the X and Y coordinates, in this case, 6 and 7, respectively, is held and sent out.

If the interruption of light beams occurs over a relatively large area dented by the symbol B in FIG. 2, the conventional practice is to hold only the coordinates at the center of the area B, which are then sent out.

An example of an apparatus of the above-described type is disclosed in Japanese Patent Publication No. 4929/1982.

In the prior art such as that described above, elements in the LED arrays are caused to sequentially perform scanning. When light beams from certain LEDs have been interrupted by the tip of a finger or a pen that accessed to the display surface in order to designate a specific position on the display surface, the coordinates detected by the mated PTRs are sent as numerical data such as hexadecimal (HEX) codes to an external processing apparatus such as a host computer. Before the host computer is able to use the sent data, the data must be subjected to numerical calculations.

The prior art also has the following drawback. When light beams have been interrupted over a relatively large area, such as that denoted at B in FIG. 2, only the center coordinates are sent out, as described before. The information processing side, e.g., the host computer, is not informed of whether the portion of the display surface where the interruption of light beams has occurred is a two-dimensional area or a point. In order to allow informing, it is necessary, if the light-interrupted portion is an area, to send data in the form of a large number of digits corresponding to those LED-PTR pairs which cover the portion where the light interruption has occurred.

SUMMARY OF THE INVENTION

The present invention has been accomplished in order to overcome the above-described problems of the prior art. It is an object of the present invention to provide an optical coordinate-input system capable of reading, at any desired time, data on the coordinates of a portion where the interruption of light has occurred, while being capable of processing data at an increased speed.

In order to achieve the above-stated object, in an optical coordinate-input system according to the present invention, the values of a scan counter that correspond to the portion where the interruption of light beams has occurred are not held. Instead, the system includes a means for holding and storing the coordinate values per se that result from scanning performed employing a scan counter. The stored values are transmitted to an external processing apparatus while they remain unchanged.

Specifically, each of lines, parallel with the X and Y coordinate axes on an input surface, is divided into, e.g., two parts which can be indicated by two bytes each consisting of eight bits, so that, as shown in FIG. 2, $X_1=(X_0, X_1, X_2, X_3, X_4, X_5, X_6, X_7)$, $X_2=(X_8, X_9, X_{10}, X_{11}, X_{12}, X_{13}, X_{14}, X_{15})$, $Y_1=(Y_0, Y_1, Y_2, Y_3, Y_4, Y_5, Y_6, Y_7)$, and $Y_2=(Y_8, Y_9, Y_{10}, Y_{11}, Y_{12}, Y_{13}, Y_{14}, Y_{15})$. When the interruption of light has occurred at the portion denoted at A in FIG. 2, the values of $X_1=(00000010)=(2)_{HEX}$, $X_2=(00000000)=(0)_{HEX}$, $Y_1=(00000001)=(1)_{HEX}$, and $Y_2=(00000000)=(0)_{HEX}$ are held by and stored in a holding means (storage device). The data stored in the storage device is sent to an external apparatus while the data remains in the same form, i.e., the data remains eight-bit 4 digit data. When the interruption of light has occurred over the portion denoted at B in FIG. 2, the values of $X_1=(00000111)=(7)_{HEX}$, $X_2=(11111000)=(F8)_{HEX}$, $Y_1=(00000111)=(7)_{HEX}$, and $Y_2=(11000000)=(C0)_{HEX}$ are held by and stored in the holding means. The data stored is sent out similarly while the data remains eight-bit 4 digit data.

With the above-described arrangement, therefore, the amount of the transmitted data remains the same regardless of any change in the size of the portion where the interruption of light has occurred. Furthermore, the size of the specified portion can be informed, without the difference in the state of the detected portion causing much difference in data transmission speed. Data can be read by, e.g., the host computer, through simple procedures, thereby enabling an increase in the data processing speed.

DESCRIPTION OF THE PREFERRED EMBODIMENT

The preferred embodiment of the present invention will now be described with reference to the drawings.

Figure 1A:
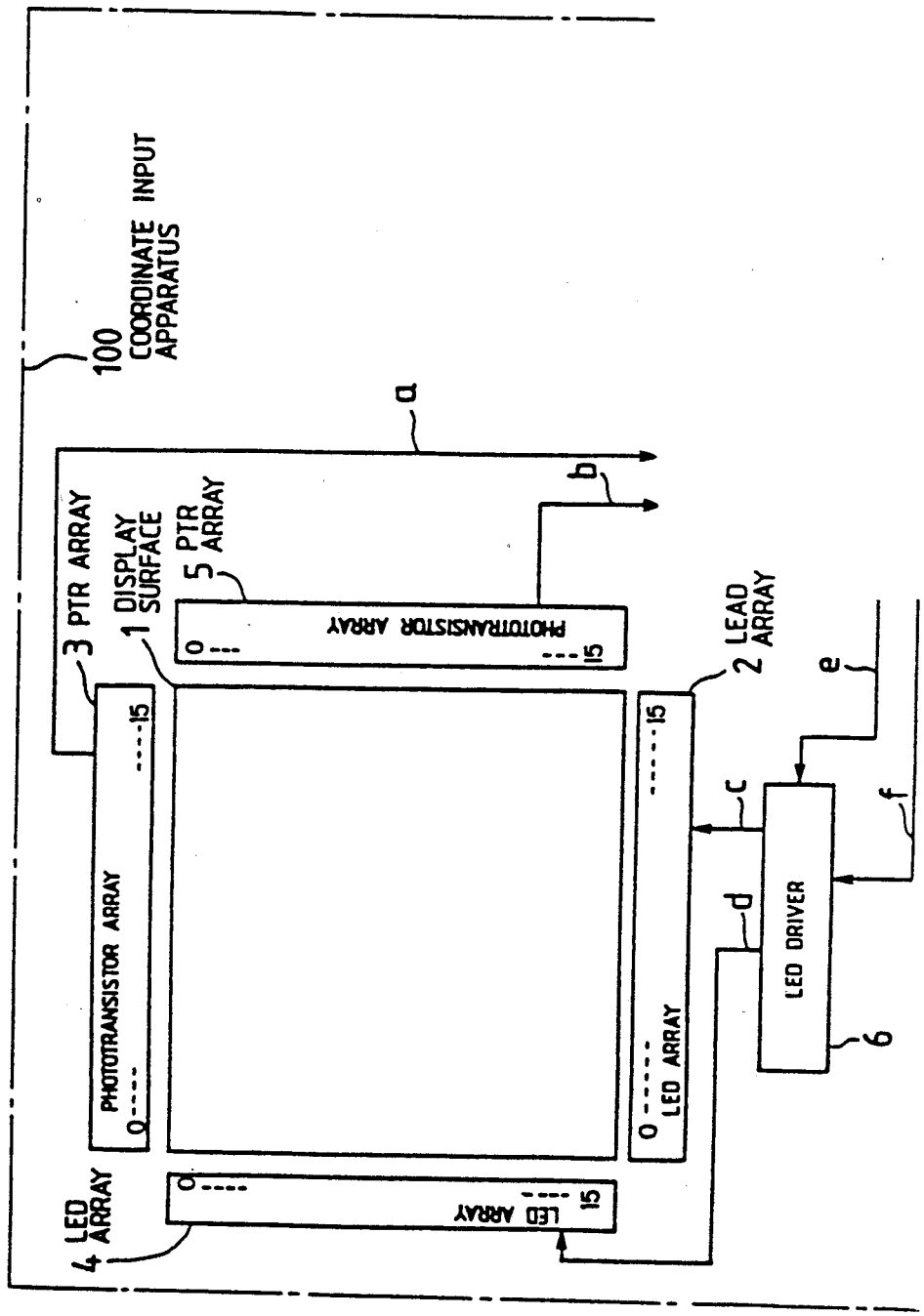
FIGS. 1a and 1b are block diagrams of one embodiment of an optical coordinate-input system according to the present invention.
Figure 1B:
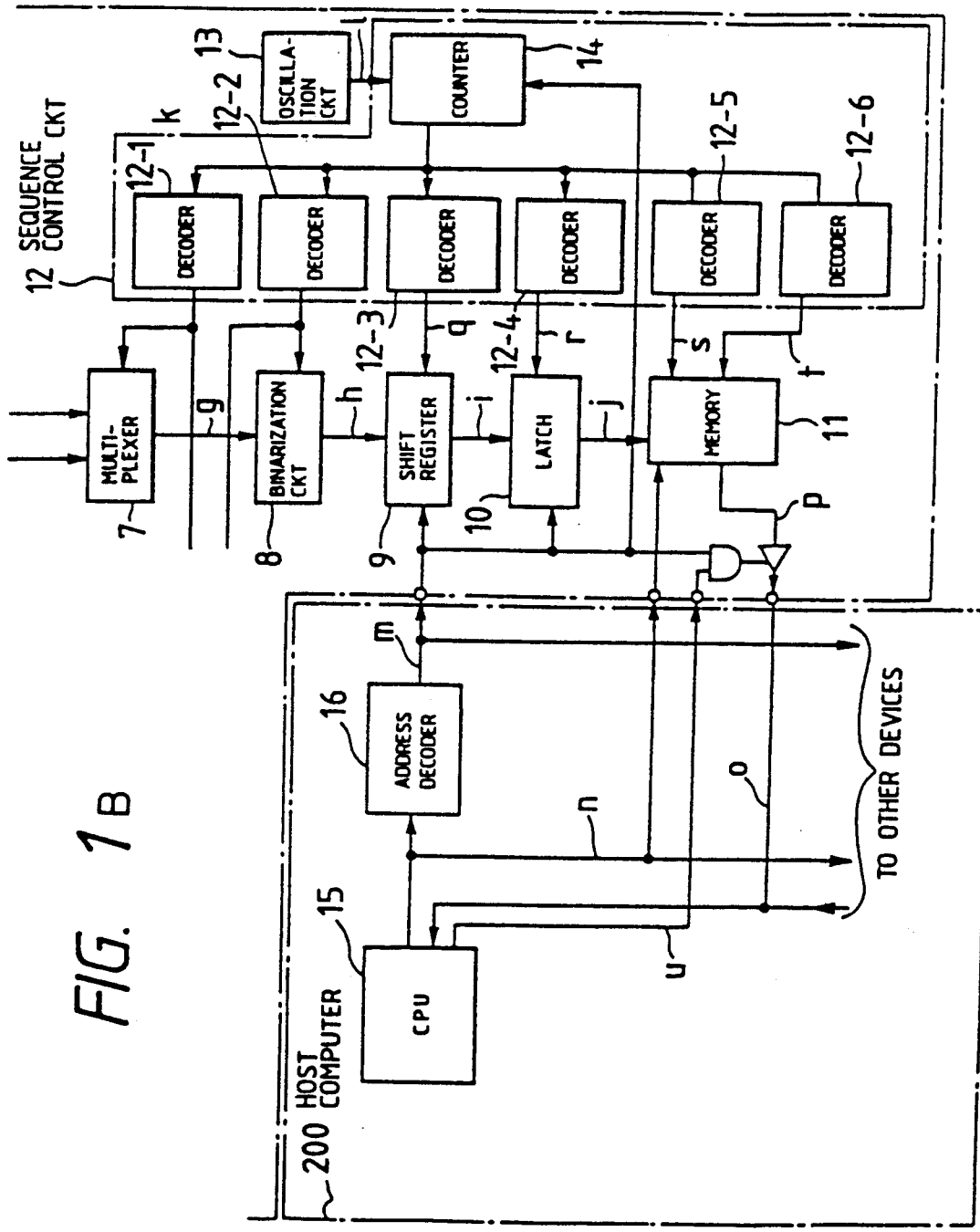

FIGS. 1a and 1b are block diagram of an optical coordinate-input system embodying the present invention. The system comprises a coordinate input apparatus 100 and an information processing apparatus 200. The coordinate input apparatus 100 includes a display surface 1 of a display such as a CRT or an LCD (hereinafter simply referred to as "display surface"), a first LED array 2 along the X coordinate axis, a first PTR array 3 along the X coordinate axis, a second LED array 4 along the Y coordinate axis, and a second PTR array 5 along the Y coordinate axis. The apparatus 100 further includes an LED driver 6, a multiplexer 7, a binarization circuit 8, a shift register 9, a latch 10, a storage device 11 (a holding device, hereinafter referred to as a "memory"), a sequence control circuit (sequencer) 12 for controlling the sequence of various actions in the apparatus 100 which has a plurality of decoders 12-1 to 12-6 and a counter 14, and an oscillation circuit 13. The information processing apparatus 200 consists of a host apparatus such as a host computer, and it includes a central processing unit (CPU) 15 and an address decoder 16.

The first LED array 2 is mated with the first PTR array 3 in such a manner that 16 pairs of light-emitting and light-receiving elements are formed by LEDs (0, 1, 2, 3, 4, 5, 6, 7, 8, 9, 10, 11, 12, 13, 14, and 15) in the first LED array 2 and PTRs (0, 1, 2, 3, 4, 5, 6, 7, 8, 9, 10, 11, 12, 13, 14, and 15) in the first PTR array 3. Similarly, the second LED array 4 is mated with the second PTR array 5 in such a manner that other 16 pairs of light-emitting and light-receiving elements are formed by LEDs (0, 1, 2, 3, 4, 5, 6, 7, 8, 9, 10, 11, 12, 13, 14, and 15) in the second LED array 4 and PTRs (0, 1, 2, 3, 4, 5, 6, 7, 8, 9, 10, 11, 12, 13, 14, and 15) in the second PTR array 5.

Figure 2:
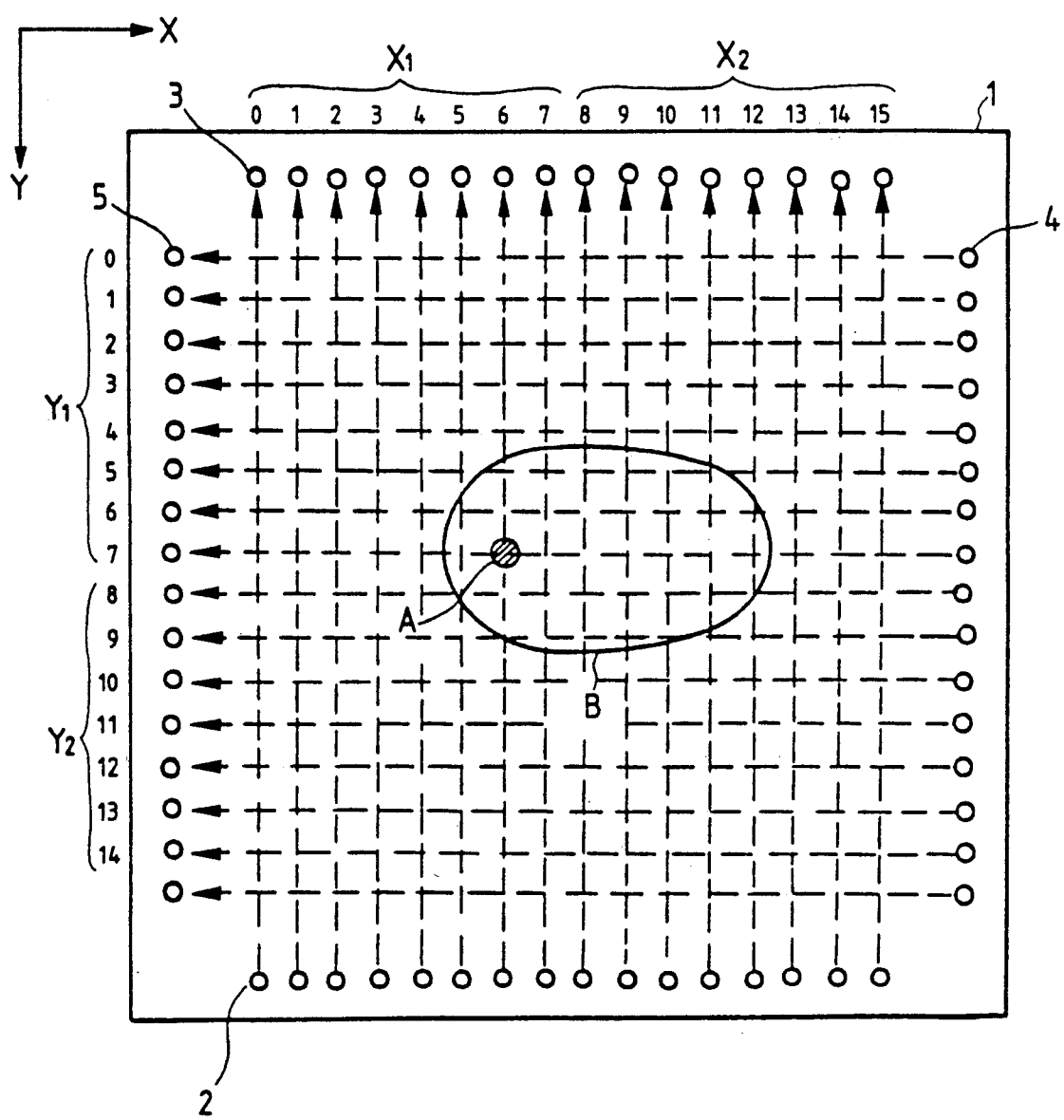
FIG. 2 is a schematic illustration used to explain the manner in which a known optical coordinate-input apparatus detects the coordinates of a specified position.

The light-emitting or light-receiving elements in each of the arrays are arranged to correspond with the X or Y coordinate axis, specifically, with two parts similar to those shown in FIG. 2, into which each of lines parallel with the X or Y coordinate axis is divided. These lines can be indicated by two bytes each consisting of eight bits. That is, an X-axis parallel line is divided into a first part $X_1 = (X_0, X_1, X_2, X_3, X_4, X_5, X_6, X_7)$ and a second part $X_2 = (X_8, X_9, X_{10}, X_{11}, X_{12}, X_{13}, X_{14}, X_{15})$, while a Y-axis parallel line is divided into a first part $Y_1 = (Y_0, Y_1, Y_2, Y_3, Y_4, Y_5, Y_6, Y_7)$ and a second part $Y_2 = (Y_8, Y_9, Y_{10}, Y_{11}, Y_{12}, Y_{13}, Y_{14}, Y_{15})$.

As shown in FIGS. 1a and 1b, the LED arrays 2 and 4 are driven by outputs c and d of the LED driver 6, respectively. The LED driver 6 comprises switching elements such as transistors, and it operates in such a manner as to sequentially select one LED from each of the LED arrays 2 and 4. The selected LEDs are driven to emit light beams such as infrared rays. As a result, the emitted beams are sequentially projected onto the mated PTRs.

When the mated PTRs in the PTR arrays 3 and 5 generate outputs a and b, respectively, these outputs are applied through the multiplexer 7 to the binarization circuit 8.

The multiplexer 7 comprises analog switches which sequentially select one PTR from each of the PTR arrays 3 and 5. The output g of the multiplexer 7 is supplied to the binarization circuit 8. The multiplexer 7 and the LED driver 7 are both driven by the same driving signal e from the decoder 12-1 or by driving signals which are identical in action. This arrangement makes one of the PTRs in each of the arrays 3 and 5 to act while being paired with the confronting LEDs in the arrays 2 and 4, respectively.

When the signals from the PTRs in the PTR arrays 3 and 5 are input to the binarization circuit 8 through the multiplexer 7, the signals are converted into digital signals which can be at the high (H) level or the low (L) level. Output h resulting from this conversion is serially supplied to the shift register 9.

The shift resister 9 stores a part of the signals serially inputted from the binarization circuit 8, the part each corresponding to eight bits. The stored eight-bit data is supplied as a parallel signal i to the latch circuit 10.

The latch 10 temporarily holds the eight-bit data from the shift register 9 until the data will be transmitted to the memory 11.

The memory 11 sequentially stores data signals j from the latch circuit 10 in such a manner that addresses of the data in the memory 11 correspond to coordinates among which the interruption of light may be detected. Addressing for writing data in the memory 11 is effected at an independent timing from the timing of addressing for reading data from the memory 11. Specifically, in the case of writing, the writing address is sequentially changed in accordance with an output s of the decoder 12-5, described later, and the data is written at different addresses in correspondence with coordinates. On the other hand, a reading signal p is generated whenever an address has been designated by an addressing signal n from the CPU 15 of the host apparatus i.e., the host computer 200, and the desired coordinate data is read via a data bus at a time determined by a read-enable signal u.

The oscillation circuit 13 generates a clock signal l, which is then supplied to the counter 14 of the sequence control circuit 12.

The clock signal l is applied to and counted by the counter 14 of the sequence control circuit 12 when the counter 14 is actuated in the manner described later. The counter 14 supplies the counted value to each of the decoders 12-1 to 12-6.

Upon the input of a preset value to each of the decoders 12-1 to 12-6, the decoders generate control pulses e, f, g, r, s and t, respectively.

The counter 14 is actuated by a chip select signal (reset release signal) m which is applied from the host apparatus 200. The signal m releases the counter 14 from its reset condition and, upon actuation, the counter 14 starts counting. When the decoders 12-1 to 12-6 generates their respective control pulses, the associated circuit blocks operate in accordance with these control pulses. So long as the chip select signal m is active, the counter 14 continues its counting action, while the decoders 12-1 to 12-6 repeat the action of generating control pulses, resulting in the associated circuit blocks repeating their actions.

The control pulses of the decoders 12-1 to 12-6 of the sequence control circuit 12 perform the following control.

The output e of the decoder 12-1 is a selection signal which allows both the multiplexer 7 and the LED driver 6 to select one LED-PTR pair opposing in the X- or Y-axis direction. The output f of the decoder 12-2 is a control signal which is supplied to the LED driver 6 and the binarization circuit 8 so as to effect the emission of light by the selected LED as well as to allow binarization to be performed in synchronization with the timing at which the LED emits light. The output q of the decoder 12-3 is a bit shift signal which is supplied to the shift register 9 so as to allow the shift register 9 to fetch data during light emission by the LED. The output signal r of the decoder 12-4 is a signal which is supplied to the latch 10 so as to allow the latch 10 to fetch data. The signal r is outputted one time each time the bit shift signal q is outputted eight times.

The output s of the decoder 12-5 is a writing signal which is generated and supplied to the memory 11 immediately after the completion of the fetching of data by the latch 10.

The output t of the decoder 12-6 is a signal which allows the writing address in the memory 11 to be changed each time the decoder 12-5 supplies the writing signal s to the memory 11. The writing address is subsequently changed to 00, 01, 10, or 11. Similar actions are repeated during the application of the chip select signal (reset release signal) m.

The chip select signal m is produced by the address decoder 16 of the host apparatus 200 on the basis of the address signal n supplied from the CPU 15.

The operation of the system having the above-described construction will be described.

(1) When the CPU 15 of the host computer 200 outputs an address signal n, a portion of this signal n is inputted to the address decoder 16 and is then converted thereby into a chip select signal m. The chip select signal m is used to select various devices connected via buses, such as input and output devices connected to a memory within the host computer 200 or to external devices.

(2) When the address decoder 16 selects the coordinate input apparatus 100 connected as an external apparatus to the host apparatus 200, and a chip select signal m is applied to the apparatus 100, the signal m is applied, as the same reset release signal, to the shift register 9, the latch 10 and the counter 14 of the sequence control circuit 12.

(3) Upon the application of the chip select signal m (reset release signal), the counter 14 of the sequencer 12 starts counting. The counter output k changes as the counted value changes.

(4) The decoder 12-6 operates in accordance with a counted value of the counter 14 to set the memory address at 00.

(5) The decoder 12-1 operates in accordance with a counted value of the counter 14 to drive multiplexer 7 and the LED driver 6 in such a manner that, first, the LED corresponding to the X coordinate "0" and the mated PTR are activated. Photoelectric current from the PTR is output by the multiplexer 7 as its output g, and is then applied to the binarization circuit 8. At this time, the LED does not emit light yet.

(6) The decoder 12-2 operates in accordance with a counted value of the counter 14 to output an LED driving signal f to the LED driver 6. Upon the application of the signal f, the LED emits light. The driving signal f is simultaneously applied to the binarization circuit 8 so that binarization is performed by the circuit 8 in synchronization with the light-emitting timing.

When the display surface 1 of the display is accessed by the tip of a finger or a pen, and light beams are interrupted at a specific position, a decrease occurs in the magnitude of photoelectric current. On the other hand, when no interruption of light beams occurs, a relatively great magnitude of photoelectric current flows. The photoelectric current is input to the binarization circuit 8 in which the current is converted into a digital signal h at either "L" level or "H" level in accordance with the light beams having been interrupted or not. The digital signal h, which thus enables the detection of light interruption, is input to the shift register 9.

(7) During the emission of light by the LED, the decoder 12-3 outputs a signal q by which the shift register 9 is shifted by one bit, and the output h of the binarization circuit 8 is held in the shift register 9.

(8) Subsequently, actions similar to those stated above under Items (3) to (6) are repeated 8 times. As a result, eight-bit data corresponding to X coordinates "0" to "7" is held by the shift register 8, before the data will be outputted as eight-bit parallel data to the latch 10.

(9) When the decoder 12-4 applies a signal r to the latch 10, the eight-bit parallel data is fed to the latch 10, and it is held therein before it will be output as a signal j to the memory 11. The decoder 12-4 outputs the signal r one time each time the actions (3) through (6) have been repeated 8 times.

(10) Immediately after the data has been latched, the decoder 12-5 outputs a memory read signal (reading signal) s so that the data j is outputted from the latch 10 and is then stored in the memory 11 at an address "00" therein.

(11) Subsequently, the decoder 12-6 operates in accordance with a count value of the counter 14 to set the memory address at "01".

(12) Similar actions are performed with respect to a second part of the X-axis parallel line which corresponds to X coordinates "8" to "15". The resultant data is stored in the memory 11 at the address "01".

(13) Next, similar actions are performed with respect to the Y coordinate axis. The resultant data is stored in the memory 11 at addresses 10 and 11.

(14) Thereafter, the actions (3) through (13) are repeated so long as the chip select signal (reset release signal) m is applied, and data is updated.

(15) When the chip select signal m is extinguished, the shift register 9, the latch 10 and the counter 14 are brought into their reset condition whereby all the data within the apparatus 100, except that in the memory 11, is initialized. This is followed by the termination of the operation of the apparatus 100. The data within the memory 11 is maintained.

(16) When data is to be read from the memory 11 of the coordinate input apparatus 100, a chip select signal m as well as a read enable signal u are applied. This application brings the output of the memory 11 from its high impedance state into its active state. Data stored in the memory 11 is output via a data bus.

As described above, in this embodiment, the input surface of the coordinate input apparatus which forms an XY coordinate system is scanned in each of the X- and Y-axis direction when a chip select signal, which is of the same kind as a chip select signal output in order to access to the memory, is input from a CPU in the host apparatus.

When the interruption of light has been detected at one or more sets of coordinates, these coordinates are stored in the memory of the coordinate input apparatus at their corresponding addresses within the memory.

The memory of the coordinate input apparatus can be connected to the CPU of the host apparatus in a manner similar to that in the case of a normal semiconductor memory, i.e., via an address bus and a data bus. The reading of data by the CPU is performed in a way similar to that in the accessing to the memory, so as to fetch coordinate data stored in the memory. Accordingly, the CPU can fetch the necessary coordinate data alone at any desired time, without requiring any special interface circuit. Since items of the fetched data correspond to their addresses in the memory, they can be used after they are precessed with ease through logical calculation.

In the foregoing embodiment, the present invention is applied to an optical coordinate-input system. Needless to say, however, the present invention may also be applied to two-dimension-scanning coordinate input systems of other types, such as a resistor film type, a volume responsive type, and an acoustic wave type.

In brief, according to the present invention, an information processing apparatus such as a host computer is capable of fetching, at any desired time, the necessary coordinate data alone from an optical coordinate-input apparatus in a way similar to that in the accessing to the memory. Since the fetching of data can be effected through simple procedures, the processing speed is increased, and data can be fetched without requiring any special interface circuit. Thus, an optical coordinate-input system according to the present invention is capable of overcoming the problems encountered with the prior art, and exhibiting excellent performance.

What is claimed is:
1. An optical coordinate-input system comprising:
a two-dimensional scanning means having a plurality of light-emitting elements and a plurality of light-receiving elements disposed on a two-dimensional plane forming an XY coordinate system, said plane having first and second pairs of mutually opposing sides, said light-emitting elements being disposed on one of said first pair of sides and on one of said second pair of sides and being arranged along each of the X and Y coordinate axes of the XY coordinate system, and said light-receiving elements being disposed on the others and arranged along each of the X and Y coordinate axes;
a light-emitting element drive means for causing said light-emitting elements of said two-dimensional scanning means to sequentially emit light so as to scan said two-dimensional plane with light beams;
a binarization means for sequentially binarizing signals outputted from said light-receiving elements, said binarization means being capable of, when said light beams are interrupted at a portion of said two-dimensional plane, binarizing signals from those light-receiving elements corresponding to said portion;
a storage means for storing data indicated by signals outputted by said binarization means, said data being stored in the form of units each consisting of a plurality of bits arranged in a sequence corresponding to the arrangement of said light-emitting elements and said light-receiving elements along the X and Y coordinate axes;
a writing control means for causing said storage means to store said data at different addresses in said storage means;
a reading control means for reading data stored in said storage means; and
a sequence control means for controlling the sequence of the actions of said two-dimensional scanning means, said light-emitting element drive means, said binarization means, said storage means, said writing control means and said reading control means.

* * * * *